No. 660,823. Patented Oct. 30, 1900.
W. C. SHERMAN.
FOUNTAIN PEN.
(Application filed May 21, 1900.)
(No Model.)
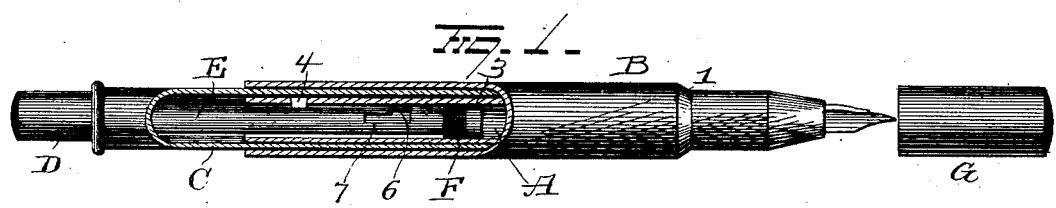
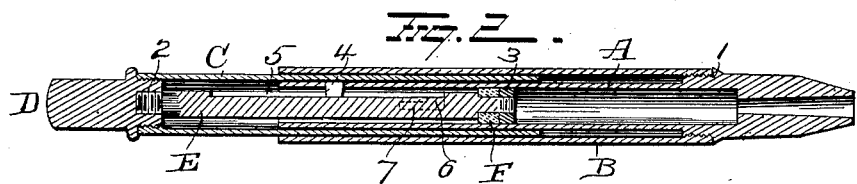
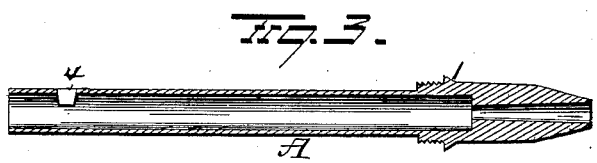
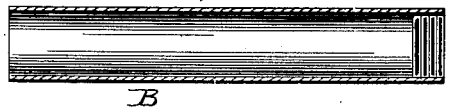
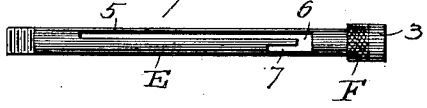
WITNESSES
E. J. Nottingham.
G. F. Downing.
INVENTOR
W. C. Sherman
By H. A. Seymour
Attorney

UNITED STATES PATENT OFFICE.

WILLIAM C. SHERMAN, OF ORLANDO, FLORIDA, ASSIGNOR OF TWO-THIRDS TO ARCHIBALD McCALLUM AND PHILIP BEWAN, OF SAME PLACE.

FOUNTAIN-PEN.

SPECIFICATION forming part of Letters Patent No. 660,823, dated October 30, 1900.

Application filed May 21, 1900. Serial No. 17,426. (No model.)

*To all whom it may concern:*

Be it known that I, WILLIAM C. SHERMAN, a resident of Orlando, in the county of Orange and State of Florida, have invented certain new and useful Improvements in Fountain-Pens; and I do hereby declare the following to be a full, clear, and exact description of the invention, such as will enable others skilled in the art to which it appertains to make and use the same.

My invention relates to an improvement in fountain-pens, one object of the invention being to provide a pen with improved means for filling the reservoir, which means are connected with and constitute a part of the pen.

A further object is to provide a fountain-pen which will be simple in construction, comparatively cheap to manufacture, neat and attractive in appearance, and easy to fill or recharge when empty.

With these objects in view the invention consists in certain novel features of construction and combinations and arrangements of parts, as will be more fully hereinafter described, and pointed out in the claims.

In the accompanying drawings, Figure 1 is a perspective view partly broken away, illustrating my improvements. Fig. 2 is a view in section of the same, and Figs. 3, 4, 5, and 6 are enlarged views of the various parts of the pen.

A represents the ink tube or reservoir of my improved pen, which is contracted at one end to receive any approved nozzle and pen-point and provided near its contracted end with a periperal enlargement 1. A tubular casing B of appreciably larger diameter than reservoir A surrounds the same and is provided with internal screw-threads at one end to mesh with screw-threads on the enlargement 1 to lock the casing B and reservoir A together.

An intermediate tube C is diposed between the reservoir A and casing B and is made with internal screw-threads at its outer or upper end to mesh with threads on a plug or head D, which latter is made in its inner end with a centrally-disposed screw-threaded socket 2, in which is screwed a piston-rod E. The forward end of the piston-rod is contracted to receive a piston F, preferably of cork, and a jam-nut 3 is screwed onto the contracted end of piston-rod E to hold the piston thereon.

The reservoir A is provided near its outer or upper end with a slot through which a removable lug 4 (preferably keystone or wedge shaped) is passed and made to project inwardly from the wall thereof, so as to be disposed in a longitudinal groove 5 in the piston-rod E to guide the same, and said rod E is provided at the forward end of the groove 5 with a short groove 6, disposed at right angles thereto, and with another short groove 7, disposed parallel to groove 5 and connected with groove 6, so that when the piston is drawn back to its extreme position the plug or head D can be turned slightly to revolve the piston-rod, the groove 6 permitting the rod to turn, when the plug and rod can be moved forward slightly to dispose the pin or lug 4 in the groove 7 and prevent any downward or inward movement of the piston.

By connecting the piston-rod and reservoir in the manner above described the lug 4 can be removed with the use of a penknife or other pointed instrument, and thus permit the piston to be removed when it becomes necessary to repair or renew the cork of the head thereof.

When it is desired to refill the reservoir, the plug D is operated to aline the pin or lug 4 and groove 5, when the piston can be moved to its extreme forward or downward position, and by simply inserting the contracted or lower end of the reservoir in ink and drawing the plug and piston upward a sufficient amount of ink will be drawn into the reservoir to fill the same, when the piston can be locked against downward movement, as heretofore explained.

A suitable cap G may be provided to inclose the pen-point when the pen is not in use and which may be inserted on the plug D when the pen is in use.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a fountain-pen, the combination with two fixed tubes disposed one within the other and spaced apart, of a movable tube telescoping between the fixed tubes, a piston in the inner fixed tube, a rod secured to said piston and to the movable tube and having an elongated slot and a wedge-shaped lug passing through the wall of the inner fixed tube and prevented from outward displacement by the intermediate tube, said lug projecting from the inner wall of the inner fixed tube and entering said elongated slot.

2. In a fountain-pen, the combination with an ink-reservoir and means for supporting a pen at one end thereof, of a piston in the reservoir, a rod projecting from said piston and having a longitudinal groove and an L-shaped groove communicating with one end of the longitudinal groove, and a removable lug projecting through the wall of the ink-reservoir and adapted to move in said grooves.

3. A fountain-pen comprising a reservoir, a casing secured to said reservoir and spaced therefrom, a tube disposed between said reservoir and casing, a piston in the reservoir, a piston-rod connecting the piston and intermediate tube, and having an angular groove and a detachable lug projecting from the reservoir and entering said groove for locking said piston and intermediate tube in their extreme outward or upper position.

4. A fountain-pen comprising a reservoir, a casing secured to said reservoir and spaced therefrom, a tube disposed between said reservoir and casing, a plug secured in the outer or upper end of said tube, a piston in the reservoir, a piston-rod connecting said piston and plug and having a longitudinal groove therein and a transverse groove extending at right angles to the longitudinal groove at its forward or lower end, and an inwardly-projecting lug or pin removably secured in the wall of the reservoir and disposed in the groove in the piston-rod to guide the same and adapted when the rod is turned to dispose the lug in the transverse groove to lock the piston against accidental movement.

In testimony whereof I have signed this specification in the presence of two subscribing witnesses.

WILLIAM C. SHERMAN.

Witnesses:
P. BEWAN,
B. M. ROBINSON.